United States Patent
Li et al.

(10) Patent No.: US 8,599,561 B2
(45) Date of Patent: Dec. 3, 2013

(54) MOUNTING APPARATUS FOR PCI CARDS

(75) Inventors: Cheng-He Li, Shenzhen (CN);
Lung-Sheng Tsai, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 94 days.

(21) Appl. No.: 13/425,382

(22) Filed: Mar. 20, 2012

(65) Prior Publication Data

US 2012/0293955 A1 Nov. 22, 2012

(30) Foreign Application Priority Data

May 18, 2011 (CN) .......................... 2011 1 0128134

(51) Int. Cl.
*H03K 5/00* (2006.01)
(52) U.S. Cl.
USPC ................ 361/726; 361/679.02; 361/679.58; 312/223.1
(58) Field of Classification Search
USPC .......................................................... 361/726
See application file for complete search history.

(56) References Cited

U.S. PATENT DOCUMENTS

| | | | | |
|---|---|---|---|---|
| 6,231,139 B1 * | 5/2001 | Chen | ........................... | 312/223.2 |
| 6,834,766 B2 * | 12/2004 | Lin et al. | ..................... | 211/41.17 |
| 7,564,696 B1 * | 7/2009 | Winick et al. | ................. | 361/801 |
| 8,072,767 B2 * | 12/2011 | Xue | .............................. | 361/755 |
| 8,382,215 B2 * | 2/2013 | Chen | ........................... | 312/223.2 |
| 2007/0177341 A1 * | 8/2007 | Chen et al. | ..................... | 361/683 |
| 2010/0002378 A1 * | 1/2010 | Chen et al. | ............... | 361/679.58 |
| 2011/0110033 A1 * | 5/2011 | Hsieh et al. | ............... | 361/679.58 |

* cited by examiner

*Primary Examiner* — Anthony Q Edwards
(74) *Attorney, Agent, or Firm* — Altis & Wispro Law Group, Inc.

(57) ABSTRACT

A mounting apparatus includes a plate and a pressing member rotatably coupled to the plate. The plate includes a frame formed with a plurality of slit ports for respectively exposing PCI cards and a supporting portion for supporting bent portions of the PCI cards. The pressing member is configured for pressing the bent portions of the PCI cards, thereby sandwiching the bent portions of the PCI cards between the pressing member and the supporting portion. A handling member is actuated to drive the pressing member to enable positioning of the pressing member relative to the supporting portion. The handling member includes a main body and two arms extending from the main body. The two arms are inserted through two slots of the plate respectively and connected to two ends of the pressing member respectively.

19 Claims, 6 Drawing Sheets

MOUNTING APPARATUS FOR PCI CARDS

BACKGROUND

1. Technical Field

The present disclosure relates to mounting apparatuses, and particularly to a mounting apparatus for securing peripheral component interconnect (PCI) cards in an electronic device.

2. Description of Related Art

PCI is a kind of bus structure, which is used for connecting to sound cards, video capture cards, graphics cards, network interface cards or other peripheral equipment, for enhancing the capabilities of the computer systems. Common methods of attaching
PCI cards include attaching screws with a screwdriver. The method of attaching may be time-consuming and troublesome, and the screws can be easily lost. Moreover, if a screw falls on the PCB and is not noticed, the PCB may short out and a great amount of damage may be done to the computer when the computer is switched on.

With the above described disadvantages in view, a need may be desired to provide an improved PCI card securing apparatus.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
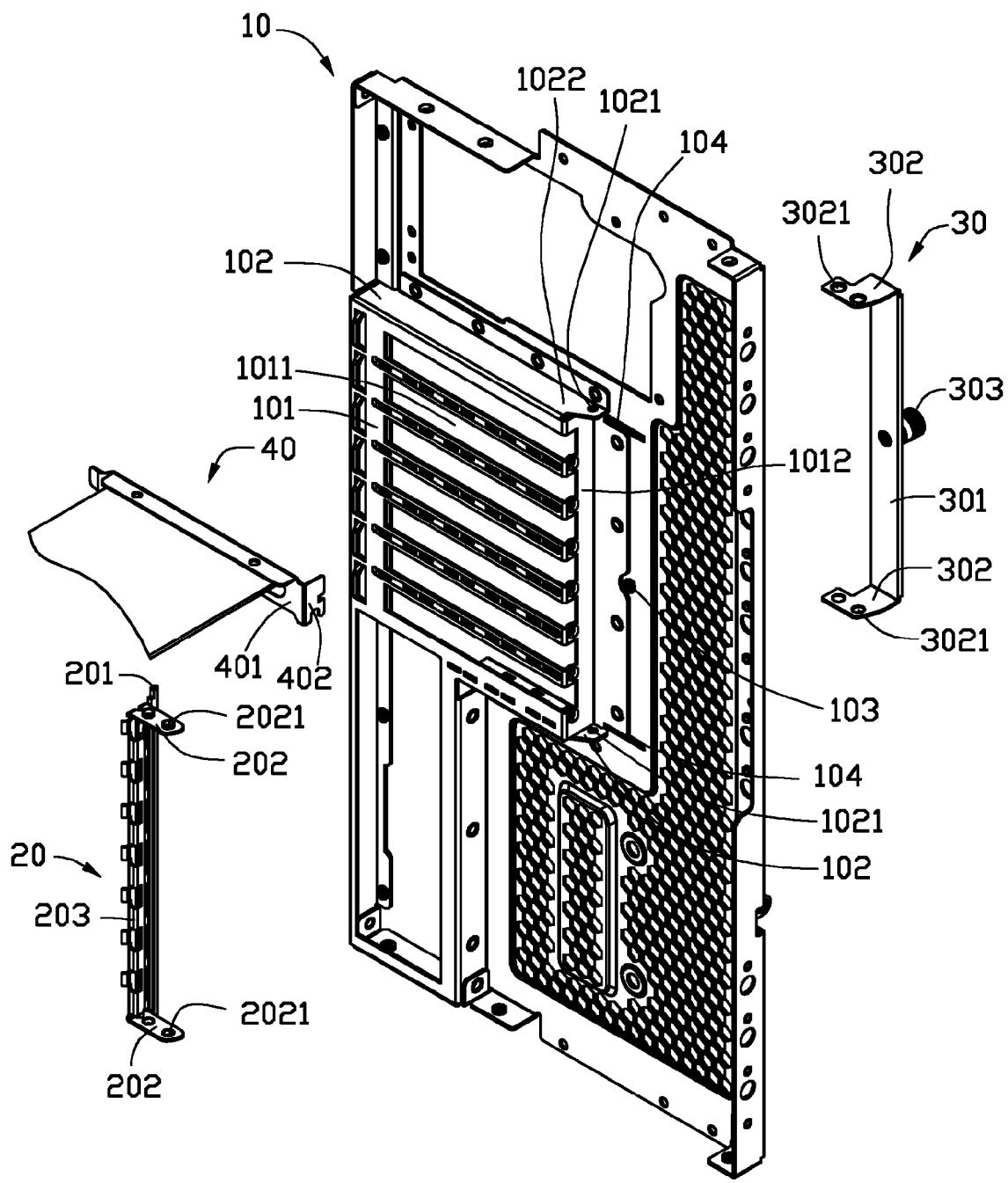
FIG. 1 is an exploded, isometric view of a mounting apparatus and a PCI card in accordance with an embodiment.
Figure 2:
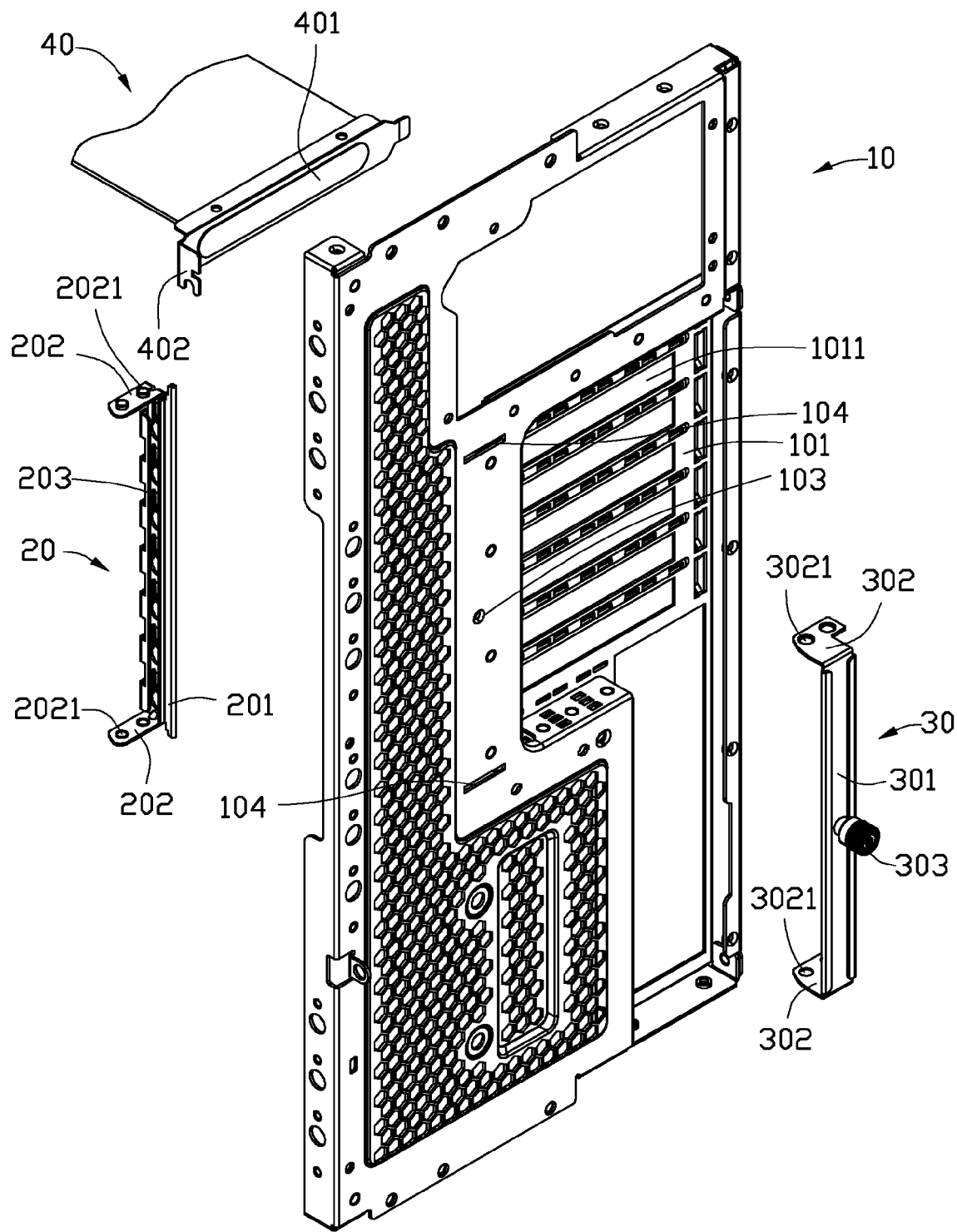
FIG. 2 is similar to FIG. 1, but viewed in a different aspect.

Referring to FIGS. 1 and 2, a mounting apparatus in accordance with an embodiment is capable of securing a PCI card 40. The mounting apparatus of an embodiment includes a plate 10, a pressing member 20, and a handling member 30. The
PCI card 40 may be, for example, a sound card, a video capture card, a graphics card, or other type of extension card. The plate 10 may be a rear plate of a computer chassis. The PCI card 40 includes a bulkhead 401 and a bent portion 402 bent from an end of the bulkhead 401.

The plate 10 includes a frame 101 formed with a plurality of slit ports 1011 for respectively exposing the PCI cards 40. The frame 101 includes a supporting portion 1012 for supporting the bent portions 402 of the PCI cards 40. The frame 101 includes two sidewalls 102. Each of the two sidewalls 102 includes an extension portion 1022. A pivoting hole 1021 is defined in each of the extension portion 1022 of each of the two sidewalls 102. A threaded hole 103 is defined in a medial location above the frame 101 of the pate 10. Two elongated slots 104, adjacent to the two extension portions 1022 of the two sidewalls 102 respectively, are defined in the plate 10.

The pressing member 20 includes a main body 203 for pressing the bent portions 402 of the PCI cards 40 and two connecting portions 202 bent from the two ends of the main body 203. Each of the two connecting portions 202 has two protrusions 2021. The pressing member 20 is pivotally mounted to the plate 10 via a shaft 201. The shaft 201 includes two step-like ends.

The handling member 30 includes a main body 301 and two handling arms 302 bent from the two ends of the main body 301. Each of the two handling arms 302 defines two securing holes 3021. According to some embodiments, the two handling arms 302 of the handling member 30 are L-shaped. The two handling arms 302 of the handling member 30 are substantially perpendicular to the main body 301 of the handling member 30.

Figure 3:
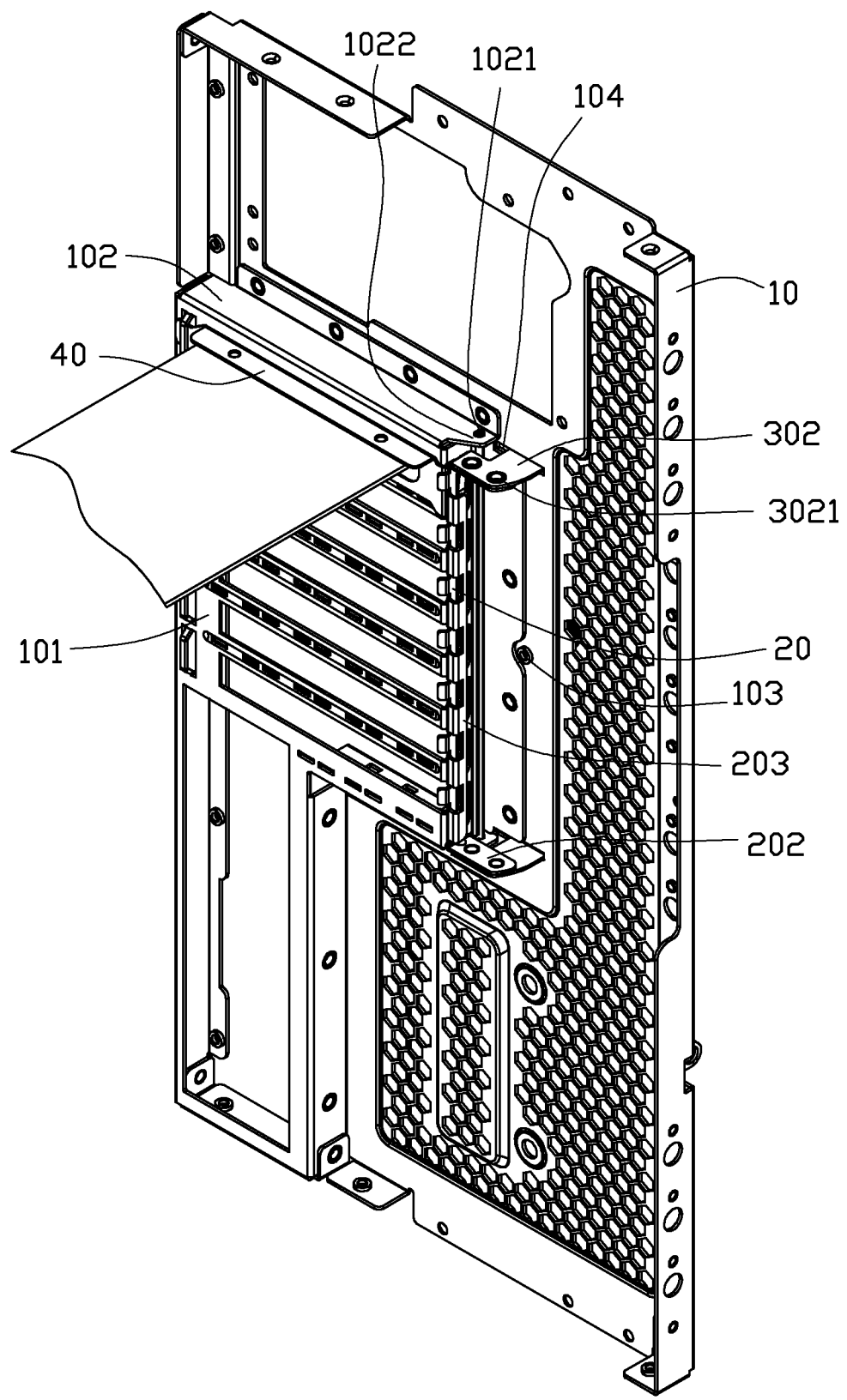
FIG. 3 is an assembled view of the mounting apparatus of FIG. 1.
Figure 4:
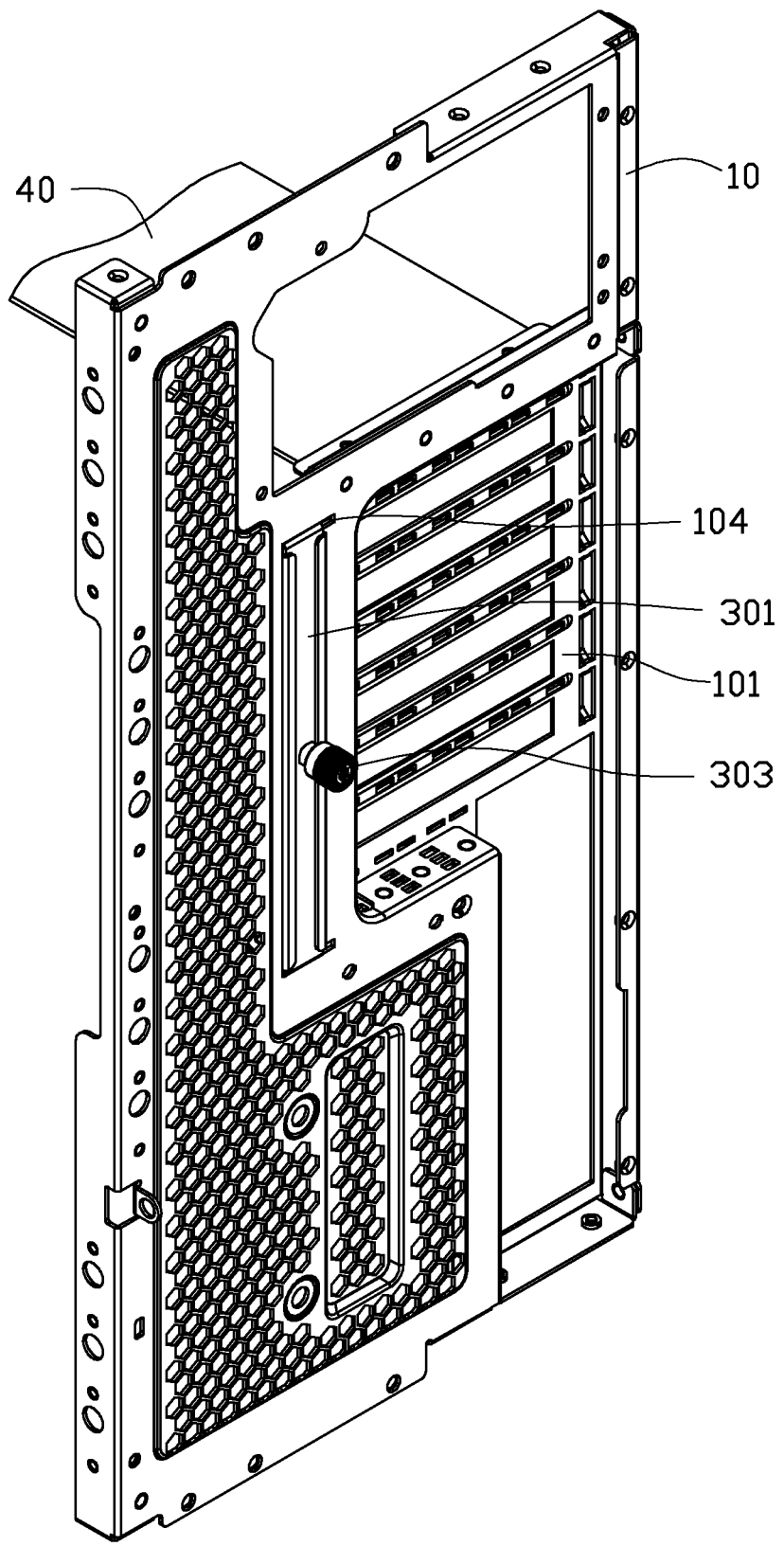
FIG. 4 is similar to FIG. 3, but viewed in a different aspect.

Referring to FIGS. 3-4, in assembly, the pressing member 20 and the handling member 30 are positioned in opposite sides of the plate 10. The two handling arms 302 of the handling member 30 are inserted through the two elongated slots 104 from the exterior side to the interior side of the plate 10. The pressing member 20 is pivotally mounted to the plate 10 by putting the two ends of the shaft 201 into the pivoting holes 1021 respectively.

Thereby the shaft 201 is fixed above the frame 101 and the pressing member 20 is rotatable about the shaft 201.

The two connecting portions 202 of the pressing member 20 are connected to the two handling arms 302 of the handling member 30 respectively by engaging each of the two protrusions 2021 of the two connection portions 202 with a corresponding one of the two securing holes 3021 of the two handling arms 302 under an interference fit. Thereby the handling member 30 is operable to actuate the pressing member 20 to enable positioning of the pressing member 20 relative to the supporting portion 1012 of the frame 101.

In use, the PCI cards 40 are received in the plurality of slit ports 1011 of the frame 101. The bent portions 402 of the PCI cards 40 abut the upper surface of the supporting portion 1012 of the frame 101. When locking the PCI cards 40 to the plate 10, the handling member 30 is actuated to drive the pressing member 20 to press the upper surface of the bent portions 402 of the PCI cards 40. Such that the bent portions 402 of the PCI cards 40 are sandwiched between the supporting portions 1012 of the frame 101 and the pressing member 20. The main body 301 of the handling member 30 abuts the exterior side surface of the plate 10. According to some embodiments, a thumb screw 303 can be used to secure the main body 301 of the handling member 30 to the plate 10 in a lock position by engaging with the threaded hole 103 of the plate 10.

Figure 5:
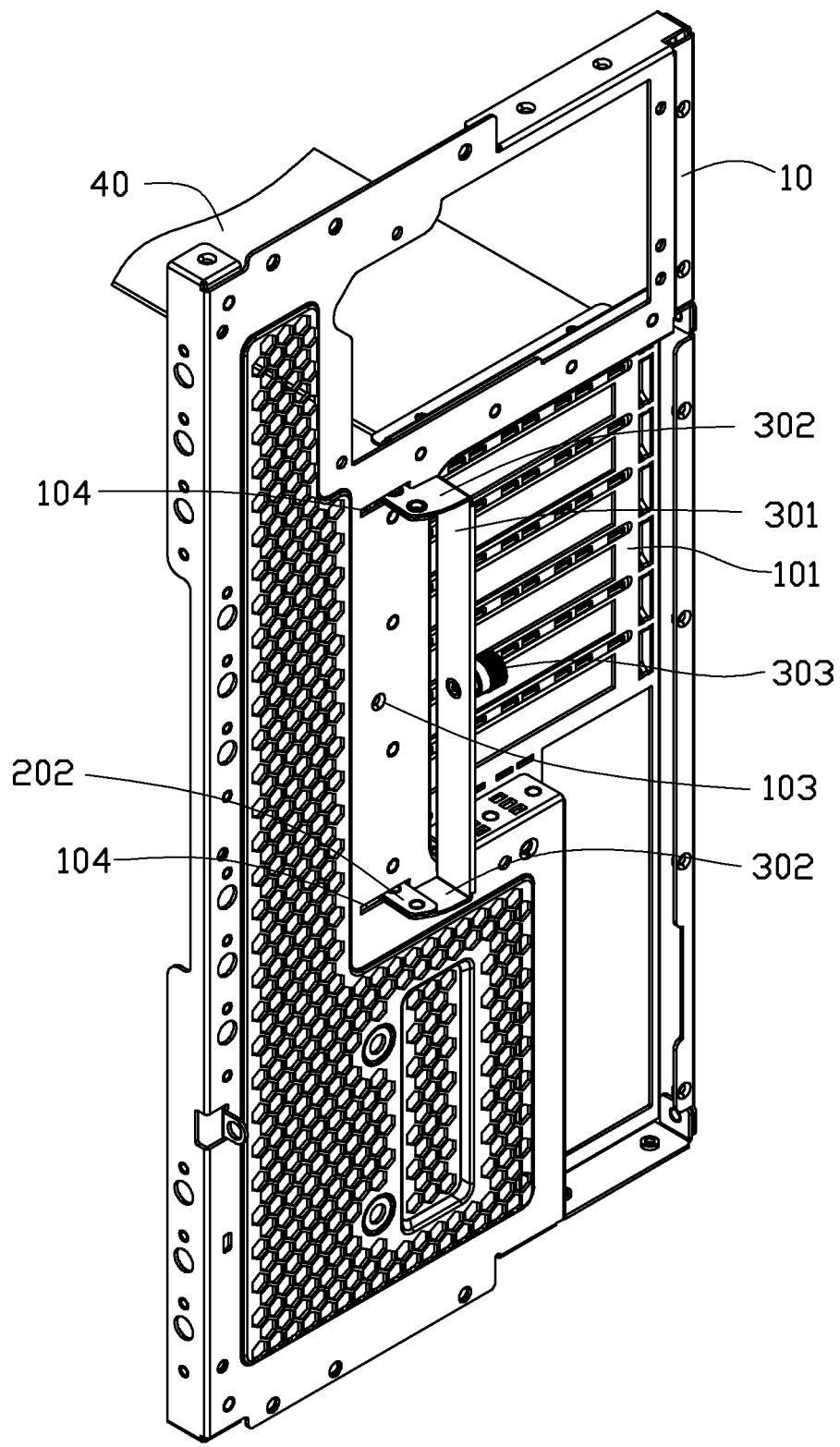
FIG. 5 is similar to FIG. 3, but shows the handling member located in an unlocked position.
Figure 6:
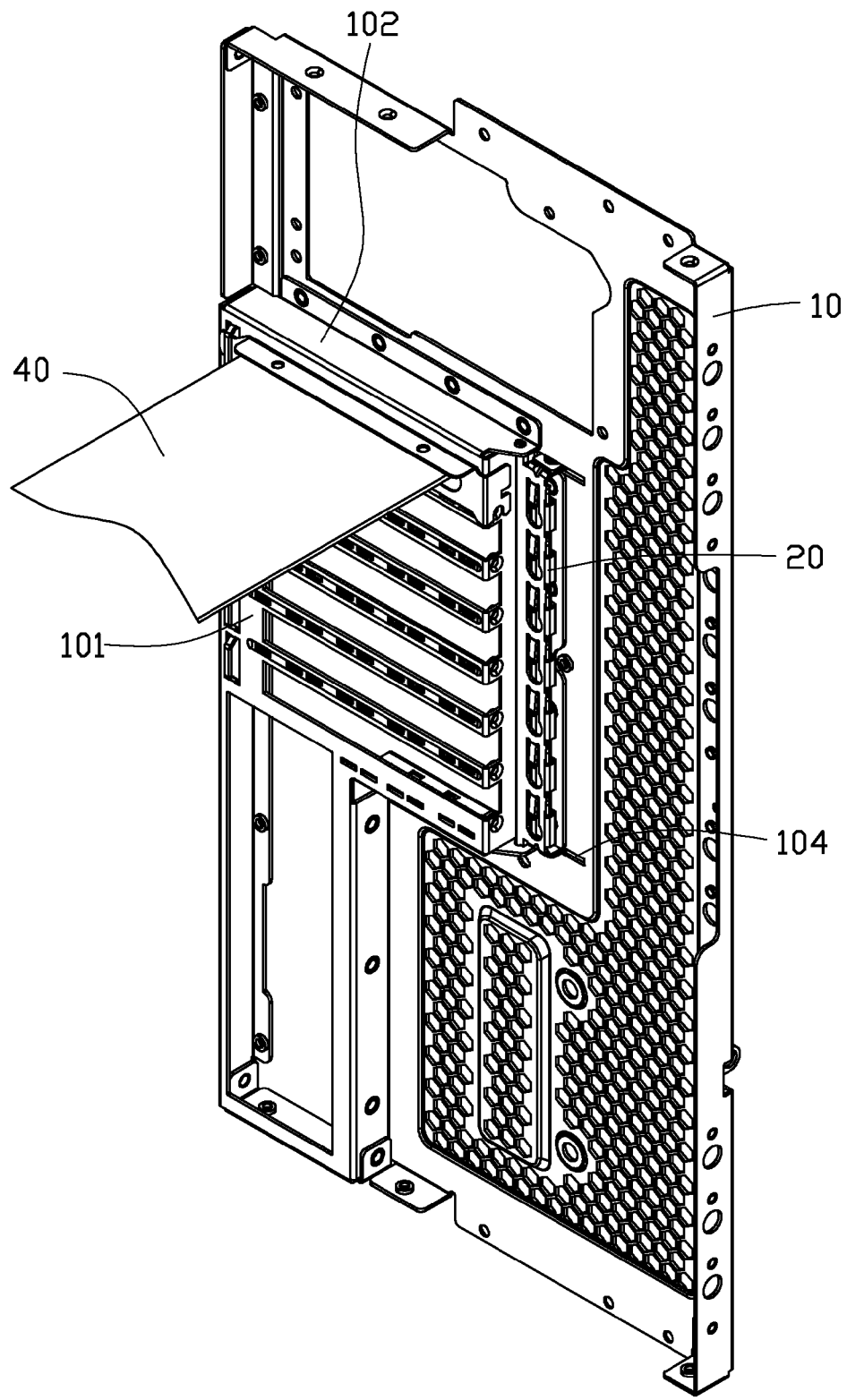
FIG. 6 is similar to FIG. 5, but viewed in a different aspect.

Referring to FIGS. 5-6, when unlocking the PCI cards 40 from the plate 10, the thumb screw 303 is actuated to release the movement of the main body 301 of the handling member 30. Then the two handling arms 302 of the handling member 30 is actuated to drive the pressing member 20 to rotate about the shaft 201 away from the bent portions 402 of the PCI cards 40. Thereby the PCI cards 40 are free to be detached from the plate 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus, comprising:
a plate comprising two slots and a frame defining a plurality of slit ports, each of the plurality of slit ports is configured to exposing a PCI card having a bent portion, and the frame comprising a supporting portion configured to support each of the bent portion; and
a pressing member rotatably coupled to the plate, the pressing member being configured to press the bent portion thereby sandwiching the bent portion between the pressing member and the supporting portion; and
a handling member for actuating the pressing member to enable positioning of the pressing member relative to the supporting portion of the frame, the handling member comprising a main body and two arms extending from the main body, wherein each of the two arms is inserted through each of the two slots and connected to each end of the pressing member.

2. The mounting apparatus of claim 1, wherein the two slots of the plate are defined in locations above the frame of the plate for receiving the two arms of the handling member.

3. The mounting apparatus of claim 1, wherein each end of the pressing member comprises a protrusion, each of the two arms comprises a securing hole, the protrusion is configured to engage with the securing hole thereby securing each end of the pressing member to each of the two arms of the handling member.

4. The mounting apparatus of claim 1, further comprising a locking member, the locking member is adapted to lock the handling member into the plate in a locked position.

5. The mounting apparatus of claim 4, wherein the plate defines a threaded hole, the locking member comprises a thumb screw engaged in the threaded hole thereby securing the handling member into the plate in the locked position.

6. The mounting apparatus of claim 1, wherein the two arms of the handling member are L-shaped.

7. The mounting apparatus of claim 1, wherein the two arms of the handling member are substantially perpendicular to the main body of the handling member.

8. The mounting apparatus of claim 1, wherein each of the two arms is inserted through each of the two slots of the plate from an exterior side to an interior side of the plate.

9. The mounting apparatus of claim 1, wherein the pressing member is pivotally mounted to the plate via a shaft.

10. The mounting apparatus of claim 9, wherein the shaft comprises two step-like ends.

11. A mounting apparatus, comprising:
a plate comprising two slots and a frame defining a plurality of slit ports, each of the plurality of slit ports is configured to exposing a PCI card having a bent portion, and the framing comprising a supporting portion configured to support each of the bent portion; and
a pressing member is pivotally mounted to the plate via a shaft to enable positioning of the pressing member relative to the support portion of the frame; and
a handling member for actuating the pressing member to press the bent portions of the PCI cards thereby sandwiching the bent portions between the pressing member and the supporting portion, the handling member comprising a main body and two arms extending from the main body, each of the two arms is inserted through each of the two slots and connected to each end of the pressing member.

12. The mounting apparatus of claim 11, wherein the two slots of the plate are defined in locations above the frame of the plate.

13. The mounting apparatus of claim 11, wherein each end of the pressing member comprises a protrusion for engaging, each of the two arms comprises a securing hole, the protrusion is configured to engage with the securing hole thereby securing each end of the pressing member to each of the two arms of the handling member.

14. The mounting apparatus of claim 11, further comprising a locking member, the locking member is adapted to lock the handling member into the plate in a locked position.

15. The mounting apparatus of claim 14, wherein the locking member comprises a thumb screw engaged with a threaded hole of the plate thereby securing the handling member into the plate in the locked position.

16. The mounting apparatus of claim 11, wherein each of the two arms of the handling member is L shaped.

17. The mounting apparatus of claim 11, wherein the two arms of the handling member are substantially perpendicular to the main body of the handling member.

18. The mounting apparatus of claim 11, wherein each of the two arms is inserted through each of the two slots of the plate from an exterior side to an interior side of the plate.

19. The mounting apparatus of claim 11, wherein the shaft comprises two step-like ends.

* * * * *